United States Patent
Ferreira et al.

(10) Patent No.: US 12,323,399 B2
(45) Date of Patent: Jun. 3, 2025

(54) INTERACTIVE ACCESS TO HEADLESS CLUSTER MANAGERS

(71) Applicant: Advanced Micro Devices, Inc., Santa Clara, CA (US)

(72) Inventors: Ian Ferreira, Issaquah, WA (US); Paulo R. Pereira De Souza, Maringa (BR)

(73) Assignee: Advanced Micro Devices, Inc., Santa Clara, CA (US)

( * ) Notice: Subject to any disclaimer, the term of this patent is extended or adjusted under 35 U.S.C. 154(b) by 209 days.

(21) Appl. No.: 17/864,878

(22) Filed: Jul. 14, 2022

(65) Prior Publication Data

US 2023/0019200 A1  Jan. 19, 2023

Related U.S. Application Data

(60) Provisional application No. 63/221,762, filed on Jul. 14, 2021.

(51) Int. Cl.
*H04L 9/40* (2022.01)

(52) U.S. Cl.
CPC .......... *H04L 63/0428* (2013.01); *H04L 63/10* (2013.01)

(58) Field of Classification Search
CPC . H04L 63/0428; H04L 63/10; H04L 41/0806; H04L 67/141
See application file for complete search history.

(56) References Cited

U.S. PATENT DOCUMENTS

| 10,911,374 | B1* | 2/2021 | Kumar | H04L 43/14 |
| 11,805,102 | B2* | 10/2023 | Woodson | H04L 63/0263 |
| 2019/0173840 | A1* | 6/2019 | Desai | H04L 67/56 |
| 2021/0064346 | A1* | 3/2021 | Exertier | G06F 8/60 |

* cited by examiner

*Primary Examiner* — Beemnet W Dada
(74) *Attorney, Agent, or Firm* — Fishman Stewart PLLC

(57) ABSTRACT

A system and method for providing automatic interactive access to headless cluster managers by combining two different resource managers with different capabilities. Hybrid cluster deployments are created, and interactive access is automatically provided to headless cluster managers by using one framework, which supports interactive access, to access the other framework, which does not natively support interactive access. A client in a first framework may create a secure connection from the first framework to a node in a second framework and then pass interactive users requests such as requests for data from storage through the first framework and the secure connection to the node in the second framework, which can access storage.

17 Claims, 4 Drawing Sheets

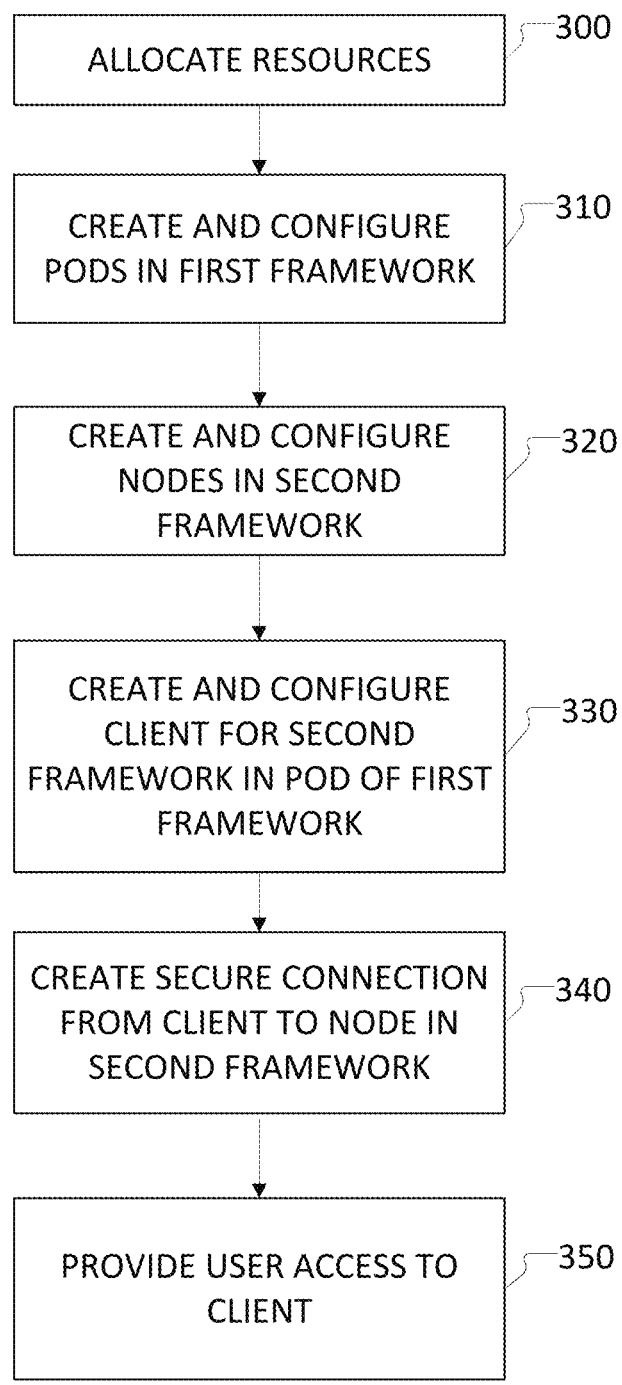

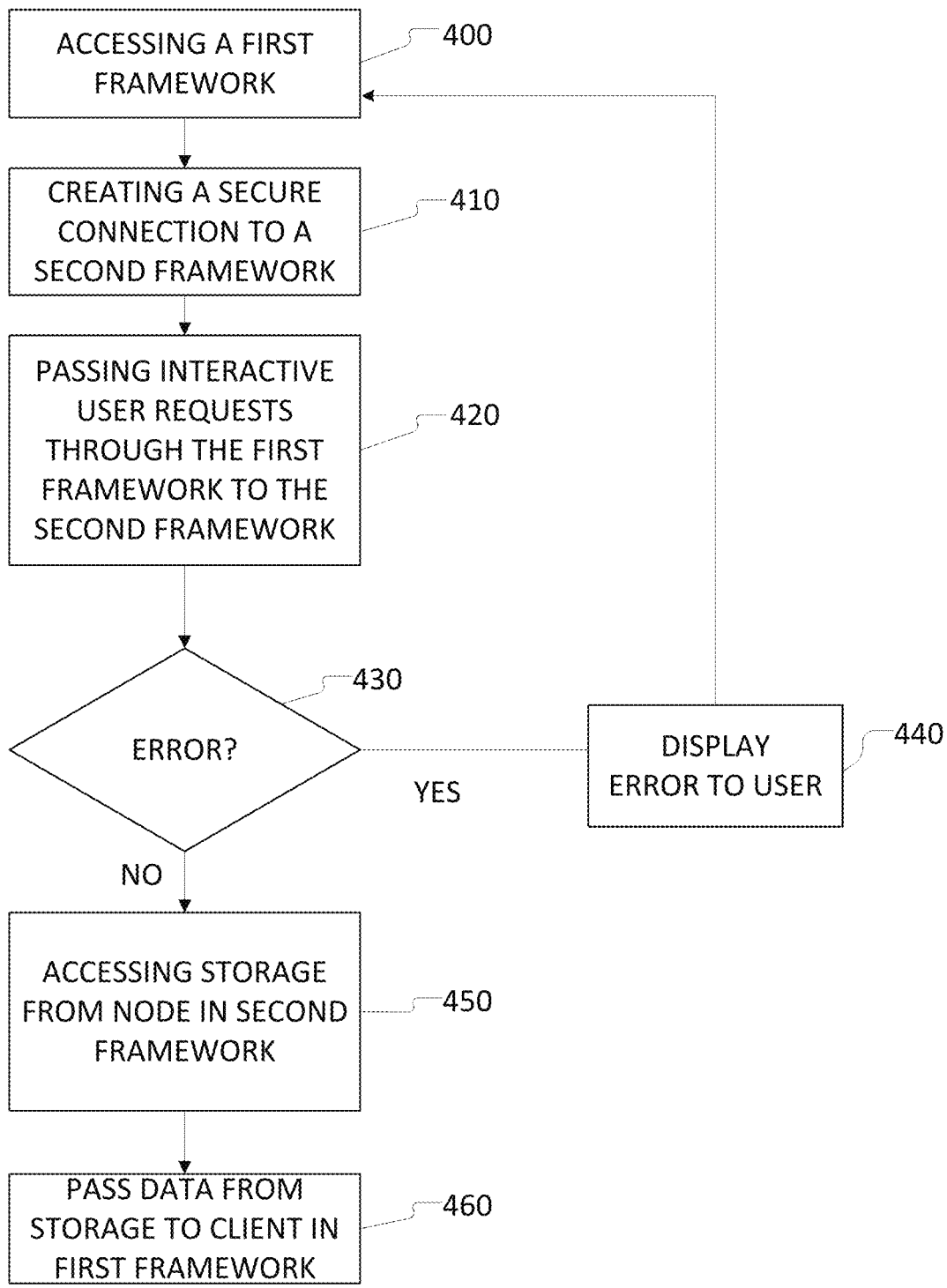

INTERACTIVE ACCESS TO HEADLESS CLUSTER MANAGERS

CROSS-REFERENCE TO RELATED APPLICATION

This application claims the benefit of and priority to U.S. Provisional Patent Application Ser. No. 63/221,762, filed on Jul. 14, 2021, the disclosure of which is hereby incorporated by reference in its entirety as though fully set forth herein.

TECHNICAL FIELD

The present disclosure generally relates to deployment and management of containerized workloads in computing environments.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Big Data and HPC (high performance computing) are increasingly popular as these types of computing are useful for artificial intelligence (AI) and machine learning (ML). Big Data jobs involve data that is large in volume and that cannot be stored and processed using traditional relational database management system (RDBMS) methods. Big data also includes different types of data like structured, unstructured, semi-structured. HPC computing is typically performed on clusters or supercomputers with large numbers of processors that combined are able to perform quadrillions of calculations per second.

Kubernetes is a popular open-source platform for managing containerized workloads and services. Kubernetes is an orchestration system for Docker containers and is based on the concepts of "labels" and "pods" to group containers into logical units. It is often used to run micro-services. It has the ability to create pods for interactive jobs and is popular for its ease of use.

Slurm is one of several open source, fault-tolerant, and highly scalable cluster management and job scheduling systems available for Linux clusters. Slurm (and Slurm Workload Manager) are often used by many of the world's supercomputers to optimize locality of task assignments on parallel computers.

While Kubernetes' focus is on container orchestration, Slurm's focus is more on scheduling jobs and workloads. Users typically select one or the other based on their particular needs. However, for some high-performance computing (HPC) and Big Data jobs, users may require highly-customized cluster configurations that would benefit from a combination of features from Kubernetes and Slurm. However, configuring and managing these complex combinations is currently a difficult and time-consuming process.

For this reason, an improved system and method for configuring and managing hybrid cluster deployments is desired. The recent dramatic increase in the number of data scientists creating HPC and Big Data jobs make this need even more critical going forward.

The foregoing discussion is intended only to illustrate examples of the present field and is not a disavowal of scope.

SUMMARY

The issues outlined above may be solved at least in part by automatically combining two different resource managers, wherein one has software-defined networking and the other does not, to create hybrid cluster deployments that provide interactive access to headless cluster managers. In one embodiment, an improved method for providing interactive access comprises accessing a client in a first framework having software-defined networking, creating a secure connection from the first framework to a node in a second framework, wherein the second framework does not have software-defined networking, and passing interactive users requests from a user through the first framework and the secure connection to the node.

The method may further comprise accessing storage via the secure connection with the node, wherein data from the storage access is passed to the client and on to the user. The client in the first framework may access storage from the node, wherein data from the storage access is passed to the client and on to the user. In some embodiments, the first framework may be Kubernetes and the second framework may be Slurm.

The method may for example be implemented as a non-transitory, computer-readable storage medium storing instructions executable by a processor of a computational device, which when executed cause the computational device to perform the method.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 3 is a flow diagram generally illustrating an example of a method of configuring a hybrid cluster deployment according to teachings of the present disclosure.

FIG. 4 is a flow diagram generally illustrating an example of a method of managing a hybrid cluster deployment according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
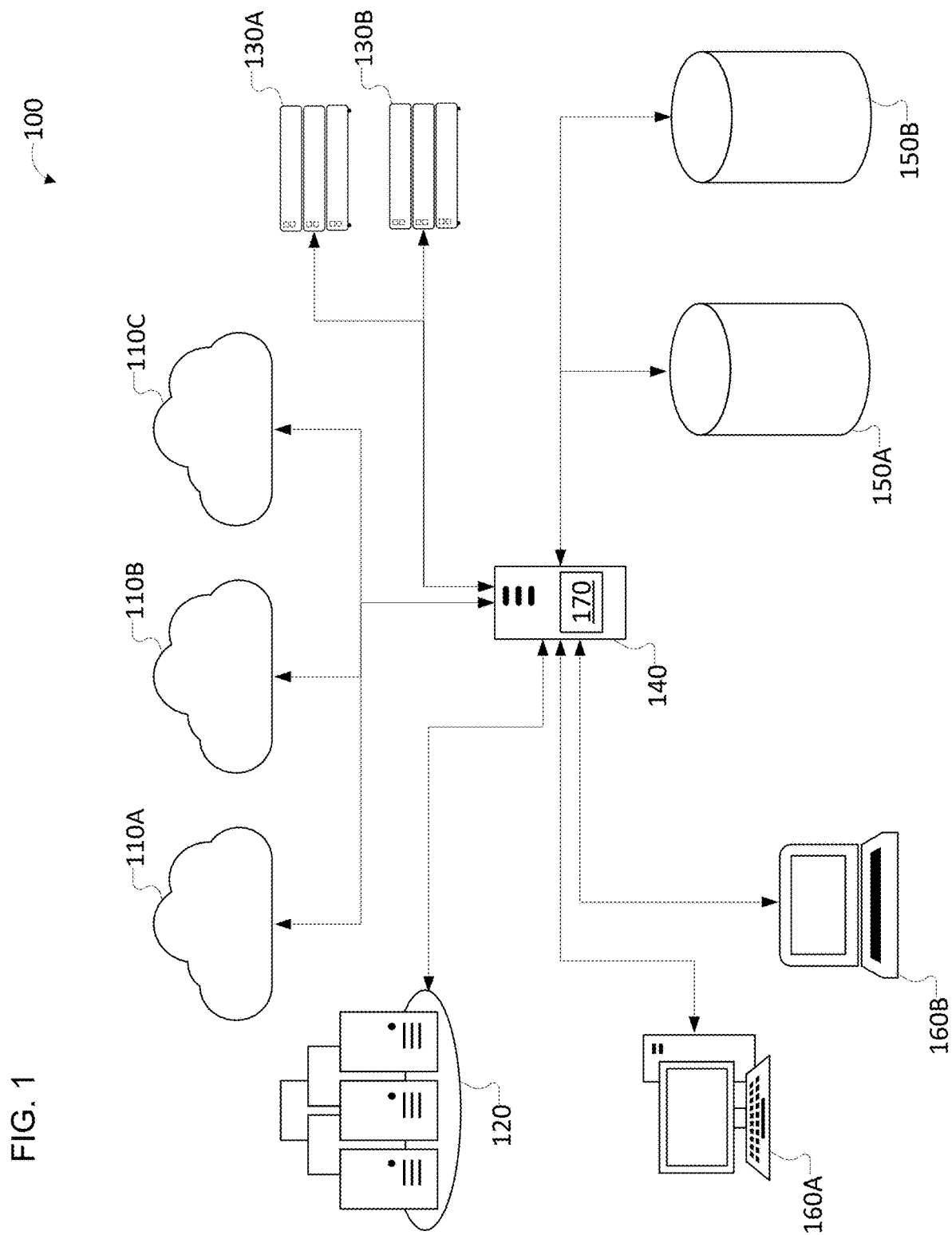
FIG. 1 is an illustration of one example of a distributed computing system.

Turning now to FIG. 1, an example of a distributed computing system 100 is shown. In this example, the distributed computing system 100 is managed by a management server 140, which may for example provide access to the distributed computing system 100 by providing a platform as a service (PAAS), infrastructure as a service (IAAS), or software as a service (SAAS) to users. Users may access these PAAS/IAAS/SAAS services from their on-premises network-connected user devices such as PCs, servers, or workstations (160A) and laptop or mobile devices (160B) via a web interface.

Management server 140 is connected to a number of different computing devices via local or wide area network connections. This may include, for example, cloud computing providers 110A, 110B, and 110C. These cloud computing providers may provide access to large numbers of computing devices (often virtualized) with different configurations. For example, systems with a one or more virtual CPUs may be offered in standard configurations with predetermined amounts of accompanying memory and storage. In addition to cloud computing providers 110A, 110B, and 110C, management server 140 may also be configured to communicate with bare metal computing devices 130A and 130B (e.g., non-virtualized servers), as well as a datacenter 120 including for example one or more high performance computing (HPC) systems (e.g., each having multiple nodes organized into clusters, with each node having multiple processors and memory), and storage systems 150A and 150B. Bare metal computing devices 130A and 130B may for example include workstations or servers optimized for machine learning computations and may be configured with multiple CPUs and GPUs and large amounts of memory. Storage systems 150A and 150B may include storage that is local to management server 140 and well as remotely located storage accessible through a network such as the internet. Storage systems 150A and 150B may comprise storage servers and network-attached storage systems with non-volatile memory (e.g., flash storage), hard disks, and even tape storage.

Management server 140 is configured to run a distributed computing management application 170 that receives jobs and manages the allocation and configuration of resources from distributed computing system 100 to run them. Management application 170 is preferably implemented in software (e.g., instructions stored on a non-volatile storage medium such as a hard disk, flash drive, or DVD-ROM), but hardware implementations are possible. Software implementations of management application 170 may be written in one or more programming languages or combinations thereof, including low-level or high-level languages, with examples including Java, Ruby, JavaScript, Python, C, C++, C#, or Rust. The program code may execute entirely on the server 140, partly on server 140 and partly on other computing devices in distributed computing system 100.

The management application 170 provides an interface to users (e.g., via a web application, portal, API server or command line interface) that permits users and administrators to submit applications/jobs via their workstations 160A, laptops 160B, and mobile devices, designate the data sources to be used by the application, designate a destination for the results of the application, and set one or more application requirements (e.g., parameters such as how many processors to use, how much memory to use, cost limits, application priority, etc.). The interface may also permit the user to select one or more system configurations to be used to run the application. This may include selecting a particular bare metal or cloud configuration (e.g., use cloud A with 24 processors and 512 GB of RAM).

Management server 140 may be a traditional PC or server, a specialized appliance, or one or more nodes within a cluster. Management server 140 may be configured with one or more processors, volatile memory, and non-volatile memory such as flash storage or internal or external hard disk (e.g., network attached storage accessible to server 140).

Management application 170 may also be configured to receive computing jobs from user devices 160A and 160B, determine which of the distributed computing system 100 computing resources are available to complete those jobs, make recommendations on which available resources best meet the user's requirements, allocate resources to each job, and then bind and dispatch the job to those allocated resources. In one embodiment, the jobs may be applications operating within containers (e.g., Kubernetes with Docker containers) or virtualized machines.

Unlike prior systems, management application 170 may be configured to automatically create hybrid cluster deployments to provide easy interactive access to headless cluster managers. These hybrid cluster deployments may for example be created by combining Kubernetes, which has a software networking layer, with Slurm, which does not and is mostly used for batch jobs. Kubernetes has the ability to create pods for interactive use, and this can be leveraged to manage Slurm batch-based schedulers.

Figure 2:
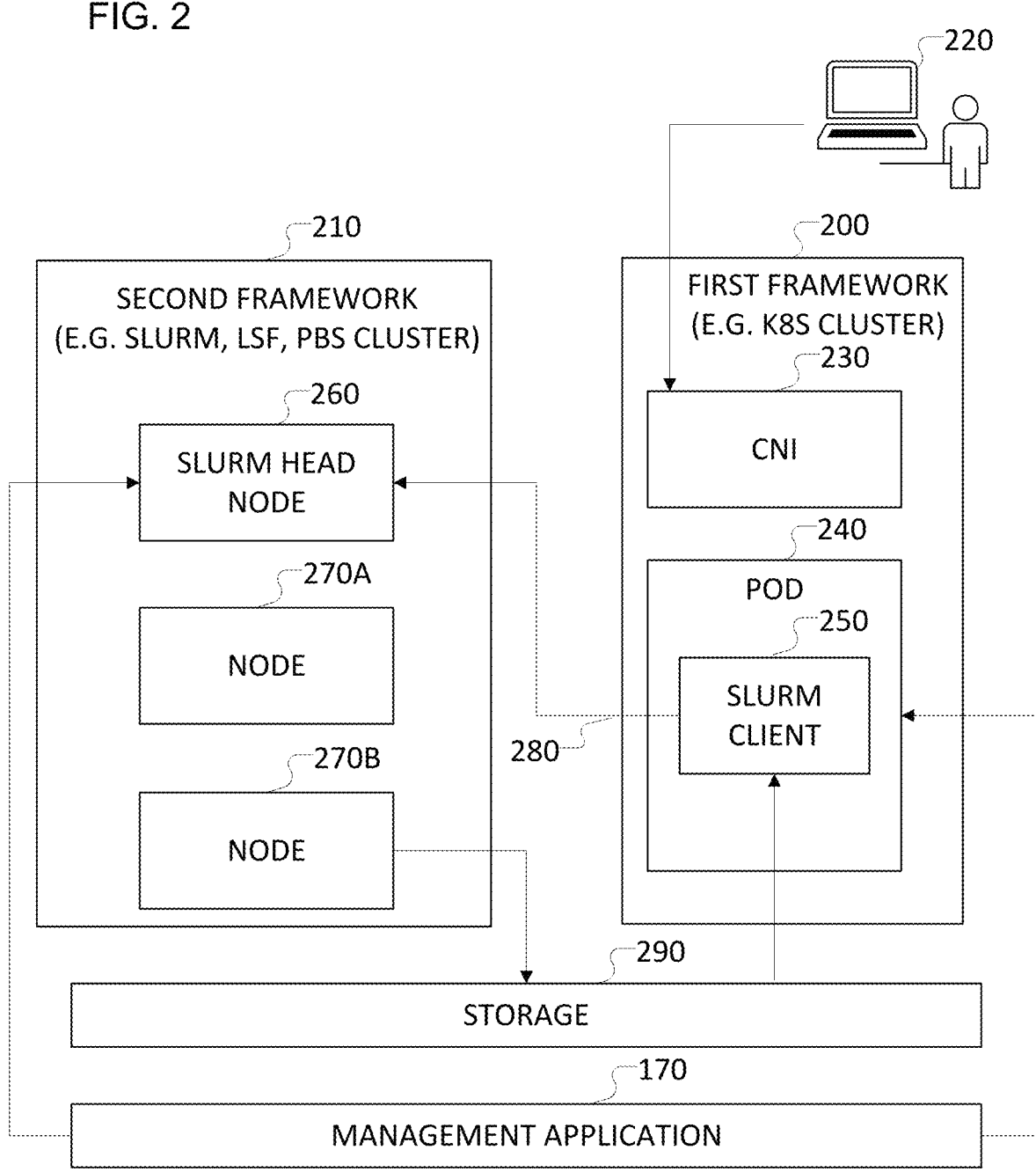
FIG. 2 is a diagram illustrating an example of a system for configuring and managing hybrid cluster deployments according to teachings of the present disclosure.

Turning now to FIG. 2, a diagram illustrating an example of a system for configuring and managing hybrid cluster deployments according to teachings of the present disclosure is shown. In this example, two different frameworks are use, a first framework 200 which supports interactive connections and a second framework 210 which does not have a software network layer and does not provide easy interactive job access. One example of a first framework 200 is Kubernetes, which has software networking support for interactive sessions via a container network interface (CNI) 230. In this example, Kubernetes is used for its user interface component and CNI 230 to provide support for interactive sessions to pod 240 which runs a client 250 for the second framework such as Slurm, which does not provide easy native access for interactive sessions.

Using the second framework 210, a cluster is configured with a master or head node 260 and one or more worker nodes 270A-B. A secure connection 280 such as ssh is used to communicate requests from the client 250 to the master or head node 260. Requests from user 220 for data from storage 290 are passed from the head node 260 to the appropriate worker node or nodes (node 270B in the illustrated example), which accesses its allocated storage 290 and forwards the date to the client 250 for access by user 220 through CNI 230.

In some embodiments, the management application 170 may create the pods, clients, nodes and connections automatically for the user. For example, the user or an administrator may interact with the management application 170 to specify which resources in the distributed computing network are required (e.g. how many master and worker nodes, CPUs/GPUs, storage, memory, etc.) and which applications are to be installed and run. The management application 170 may then automatically allocate, create, and configure the system and connections.

Turning now to FIG. 3, a flow diagram generally illustrating an example of a method of configuring a hybrid cluster deployment according to teachings of the present disclosure is shown. Resources in the distributed computing network are allocated (step 300) to create and configure pods in a first framework that has a software networking layer that supports interactive access such as Kubernetes (step 310). Nodes are created, including a headless cluster manager node and one or more worker nodes with access to storage, and configured in a second framework that does not have a software networking layer and does not provide easy interactive access (step 320).

A client is created and configured in the first framework, for example in a pod in Kubernetes (step 330), and a secure connection such as ssh is created from the client in the first framework to the headless cluster manager node in the second framework (step 340). The user is provided access to the client (step 350), which the user can use to easily access the nodes (and indirectly their storage).

Turning now to FIG. 4, a flow diagram generally illustrating another embodiment of a method of managing a hybrid cluster deployment according to teachings of the present disclosure is shown. The user accesses a first framework (step 400) such as Kubernetes, and a secure connection is created to a second framework (step 410) such as Slurm. Interactive user requests for data are passed through the first framework, which supports interactive connections via a software networking layer to the second framework (step 420), which does not, via a secure network connection such as ssh.

If an error occurs (step 430), it is displayed to the user (step 440). If not, the storage associated with nodes in the second framework is accessed (step 450), and the requested data is passed from storage to the user via the client in the first framework (step 460).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A method for accessing resources comprising:
   accessing a client on a first cluster with a first framework having software-defined networking;
   creating a secure connection from the first cluster to a node on a second cluster with a second framework, wherein the second framework does not have software-defined networking; and
   passing interactive users requests from a user through the first cluster using the client and the secure connection to the node on the second cluster.

2. The method of claim 1, wherein the secure connection is ssh.

3. The method of claim 1, further comprising accessing storage from the node, wherein data from the accessed storage is passed to the client and on to the user.

4. The method of claim 1, wherein the first framework is Kubernetes.

5. The method of claim 1, wherein the second framework is Slurm.

6. A non-transitory, computer-readable storage medium storing instructions executable by a processor of a computational device, which when executed cause the computational device to:
- access a client on a first cluster with a first framework having software-defined networking;
- create a secure connection from the first cluster to a node on a second cluster, with a second framework, wherein the second framework does not have software-defined networking; and
- pass interactive users requests from a user through the first cluster using the client and the secure connection to the node on the second cluster.

7. The non-transitory, computer-readable storage medium of claim 6, wherein the instructions, when executed, further cause the computational device to access storage from the node; wherein data from the storage access is passed to the client and on to the user.

8. The non-transitory, computer-readable storage medium of claim 6, wherein the secure connection is ssh.

9. The non-transitory, computer-readable storage medium of claim 6, wherein the first framework is Kubernetes.

10. The non-transitory, computer-readable storage medium of claim 6, wherein the second framework is Slurm.

11. The non-transitory, computer-readable storage medium of claim 6, wherein the instructions, when executed, further cause the computational device to configure the second cluster to include at least one headless cluster manager and at least one worker node.

12. The method of claim 1 further comprising configuring the second cluster to include at least one headless cluster manager and at least one worker node.

13. A system, comprising:
- at least one processor configured to:
  - access a client on a first cluster with a first framework having software-defined networking;
  - create a secure connection from the first cluster to a node on a second cluster, with a second framework, wherein the second framework does not have software-defined networking; and
  - pass interactive users requests from a user through the first cluster using the client and the secure connection to the node on the second cluster.

14. The system of claim 13, wherein the secure connection is ssh.

15. The system of claim 13, wherein the first framework is Kubernetes.

16. The system of claim 13, wherein the second framework is Slurm.

17. The system of claim 13, wherein the at least one processor is further configured to configure the second cluster to include at least one headless cluster manager and at least one worker node.

* * * * *